United States Patent
Dawson et al.

(10) Patent No.: US 7,398,924 B2
(45) Date of Patent: Jul. 15, 2008

(54) VARIABLE RATE TOLL SYSTEM

(75) Inventors: Christopher James Dawson, Arlington, VA (US); Peter George Finn, Brampton (CA); Barry Michael Graham, Silver Spring, MD (US); Rick Allen Hamilton, II, Charlottesville, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/985,246

(22) Filed: Nov. 14, 2007

(65) Prior Publication Data

US 2008/0065568 A1 Mar. 13, 2008

(51) Int. Cl.
G07B 15/02 (2006.01)

(52) U.S. Cl. .................. 235/384; 340/928; 705/13

(58) Field of Classification Search .................. 235/384, 235/375, 382, 382.5; 705/13
See application file for complete search history.

(56) References Cited

U.S. PATENT DOCUMENTS

| | | | |
|---|---|---|---|
| 5,381,155 A * | 1/1995 | Gerber | 342/104 |
| 5,617,086 A * | 4/1997 | Klashinsky et al. | 340/907 |
| 5,850,191 A * | 12/1998 | Yagi et al. | 340/928 |
| 6,019,285 A * | 2/2000 | Isobe et al. | 235/384 |
| 6,411,889 B1 * | 6/2002 | Mizunuma et al. | 701/117 |
| 7,215,255 B2 * | 5/2007 | Grush | 340/932.2 |
| 2004/0119609 A1 * | 6/2004 | Solomon | 340/928 |
| 2005/0168351 A1 * | 8/2005 | Saze et al. | 340/928 |
| 2007/0100687 A1 * | 5/2007 | Yoshikawa | 705/13 |

* cited by examiner

*Primary Examiner*—Michael G. Lee
*Assistant Examiner*—Paultep Savusdiphol
(74) *Attorney, Agent, or Firm*—David A. Mims, Jr.; Robert V. Wilder

(57) ABSTRACT

A method and system are provided in which average vehicle speeds of tolled and non-tolled road segments between two locations are monitored and saved for reference in providing dynamic adjustment of the toll amount to be charged for use of the tolled segment in order to insure an efficient use of the tolled segment and a determination of an appropriate toll amount to be charged drivers in the tolled segment in view of real time traffic conditions of the tolled and the non-tolled segment. The toll adjustments are determined based upon the difference between actual average speeds of the tolled segment and actual average speeds of the non-tolled segment such that the toll adjustments are dynamic and depend upon real time traffic conditions in both the tolled and non-tolled segments of the travel route.

12 Claims, 5 Drawing Sheets

| | ENTRY (403) | D(m) AVE SPEED (405) | D(m+1) AVE SPEED (407) | .... EXIT (409) | E-E AVE SPEED (411) |
|---|---|---|---|---|---|
| A | E1 | 45 | 48 | E10 | 47 |
| B | E2 | 50 | | | |
| C | E1 | 48 | | | |
| D | E3 | 51 | | | |

VARIABLE RATE TOLL SYSTEM

FIELD OF THE INVENTION

The present invention relates generally to information processing systems and more particularly to a system and methodology for enabling automatic adjusting of a toll amount in response to detected vehicle traffic.

BACKGROUND OF THE INVENTION

In many areas where vehicle traffic is heavy at times, toll roads or toll road segments have been created to enable drivers to go from one location to another in a shorter time period than if they had taken non-toll alternative routes. The use of toll road segments is becoming a burgeoning and proposed trend in many countries. The use of toll and non-toll segments of certain routes between two locations may be implemented, for example, by separate multi-lane roads or even with a toll segment of a single multi-lane highway in order to enable the toll segment to be utilized as efficiently as possible such that free flow of vehicles can be maintained even during high volume "rush hour" periods. Typically, a non-toll road segment has traffic control systems and crossroads where traffic can cross whereas, for the same general route, a toll segment will have no crossroads or traffic signals. Even with toll and non-toll segments however, at times, there may be more traffic on one segment and less on the other segment and this situation may result in an inefficient use of toll and non-toll segments between two locations along a travel route.

For toll roads, electronic toll collection has been available for many years now. The contradiction of a regular toll is that for frequent travelers, the use of a tolled road segment becomes second nature—the idea of paying for the trip becomes so natural that they use the toll road without even thinking. As a result, many of today's toll roads, originally built to save time, are often more congested than the roads they were originally built to replace. Express Toll Lanes exist where lanes of traffic are reserved for vehicles that wish to pay in order to increase the probability of receiving a shorter duration to complete the journey between two specific locations where both a tolled and a non-toll road exists. As traffic congestion increases, the cost of using the road increases to act as a deterrent to using the tolled road segment. The primary issue with this type of approach is that drivers may not receive any benefit from the usage of the toll road instead of the non-toll roads, therefore not receiving value for payment of the toll. If the estimated time taken to drive the non-toll lanes is around the same time to drive the tolled lanes, then there is no value in using the tolled lanes. Also, paying a premium to use the toll lane does not necessarily guarantee free moving traffic.

Thus, there is a need for an improved system in which the amount of toll being charged in tolled segments of a travel route which includes both tolled and non-tolled segments, is adjusted so that the likelihood of free-flowing traffic in conjunction with providing value for money for the drivers in the vehicles which are using the tolled road segment is insured and maintained.

SUMMARY OF THE INVENTION

A method and system are provided in which average vehicle speeds of tolled and non-tolled road segments between two locations are monitored and saved for reference in providing dynamic adjustment of the toll amount to be charged for use of the tolled segment in order to insure an efficient use of the tolled segment and a determination of an appropriate toll amount to be charged drivers in the tolled segment in view of real time traffic conditions of the tolled and the non-tolled segment. In an exemplary embodiment, a desired free-flow average vehicle speed is determined and input to a toll calculating system. When the calculated actual average speed of vehicles on the tolled segment is less than the desired free-flow average vehicle speed, a toll increase is processed, and when the calculated actual average speed of vehicles on the tolled segment is equal to or less than the desired free-flow average vehicle speed, a toll decrease is processed. The toll adjustments are determined based upon the difference between actual average speeds of the tolled segment and actual average speeds of the non-tolled segment such that the toll adjustments are dynamic and depend upon real time traffic conditions in both the tolled and non-tolled segments of the travel route.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
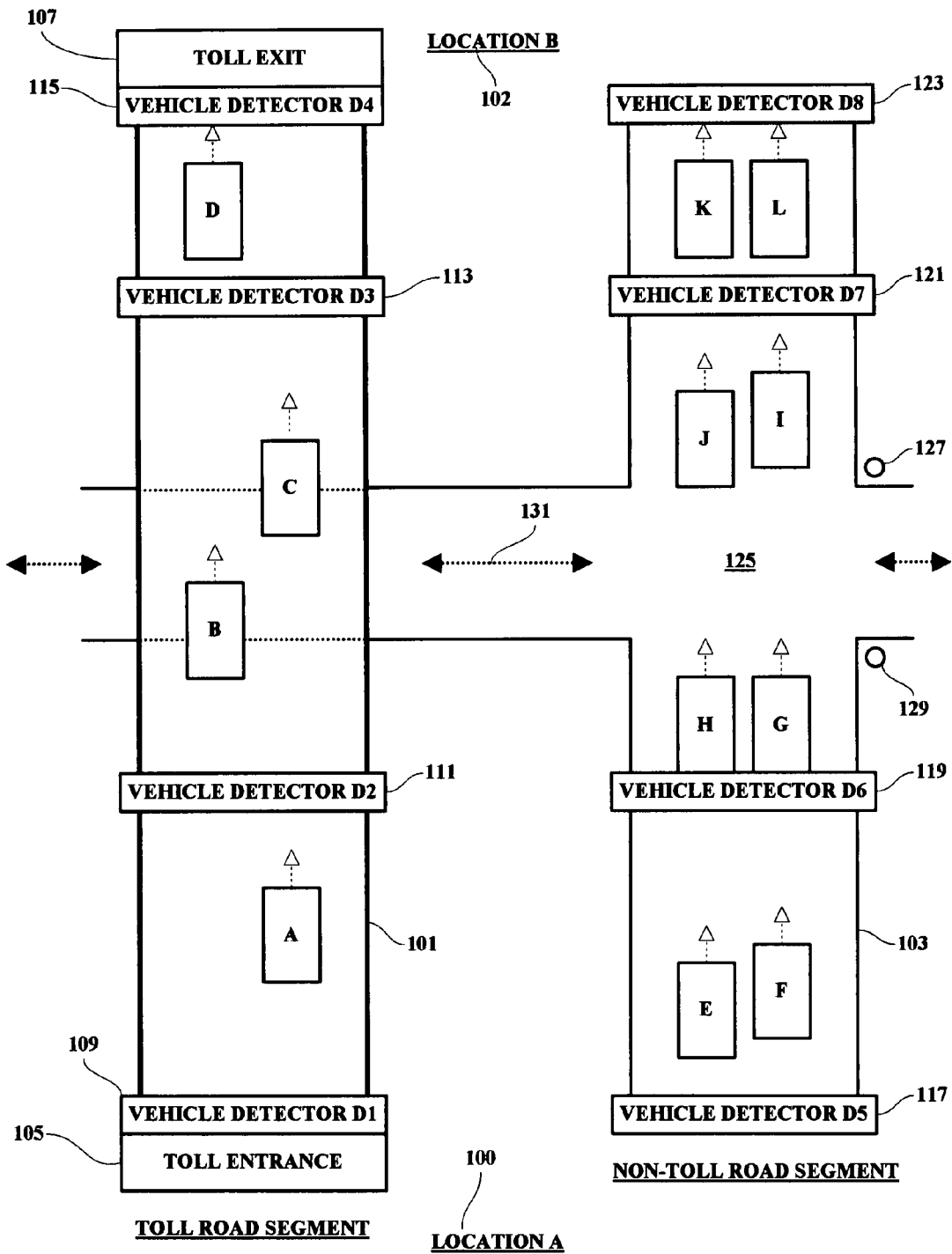
FIG. 1 is an overall system schematic illustrating an exemplary arrangement in which the present invention may be implemented.

It is noted that circuits and devices which are shown in block form in the drawings are generally known to those skilled in the art, and are not specified to any greater extent than that considered necessary as illustrated, for the understanding and appreciation of the underlying concepts of the present invention and in order not to obfuscate or distract from the teachings of the present invention.

As herein disclosed, the core idea of this invention surrounds better calculation of toll charges, in real time, in order to: (1) optimize the tolled lanes to increase the likelihood that the tolled lanes are able to carry free moving vehicles even during peak volumes; and (2) ensure that the toll price is calculated based on the improvement of service (or faster trip time than using the non-toll road lanes) to the drivers of each vehicle. In order to more effectively calculate the toll charge, the processing takes three inputs: (1) the average speed of vehicles currently in the tolled road segment; (2) the average speed of vehicles currently in the non-toll road segment; and (3) the actual time taken for the vehicle to travel the tolled segment. The processing can be customized to determine what is the threshold that defines "free moving traffic". For example, if the preferred average speed of vehicles is set to 50 mph, this speed can be preset and used in the processing to set toll charges accordingly to maximize the probability that a vehicle will travel at around 50 mph. The average speed of vehicles in the tolled section will be calculated by optically scanning the license plates, using one of many forms of electronic tagging in conjunction with radio frequency identification, or performing any other forms of electronic, visual or non-visual vehicle recognition as they enter and leave the tolled lane segment. The speed of each vehicles is obtained across various segments throughout the duration of the trip and this can then be averaged to show the current real time average speed of the toll lanes between any two locations.

The average speed of the vehicles in the non-toll lanes or road segment will be calculated in the same way as those in the tolled lanes or road segment using a plurality of methods including license plate OCR, visual recognition or other Radio Frequency (RF) techniques for example. The average duration to complete the journey between two similar points on the non-toll road is also calculated and a comparison is created and updated in real time.

The actual time taken for a specific vehicle to travel the tolled road segment is calculated. This can be achieved by a plurality of different methods not limited to: (1) utilizing an RF type of smart tag in each car; (2) an initial pay booth issuing a paper ticket stamped with time entered the toll lanes and another pay booth when exiting; (3) utilizing optical license plate recognition; (4) utilizing global positioning system (GPS) technologies to monitor progress of the vehicle; and/or any other form of optical or electronic recognition schemes.

The processing utilizes the three parameters above. The purpose of the disclosed processing is to maximize the likelihood that free flow traffic can be maintained on the tolled lanes whilst ensuring that the drivers of each vehicle receive a better service than using the non-toll roads. The average speed of the vehicles in the tolled lanes is constantly monitored. If the average speed drops below the "free flow" preset or pre-determined speed, the toll is increased. If the average speed of the vehicles in the toll lane starts to exceed (or maintains) the "free flow" preset speed, the toll is reduced. The average speed of the vehicles in the non-toll section of the road is also monitored, because as the speed of vehicles starts to decrease, the increased likely hood that more cars will attempt to use the tolled section of the road. The processing will proportionally increase and decrease based on the delta of average speeds of both the toll and non-toll lanes. One aspect of one exemplary embodiment of the present invention involves how the difference or "delta" between the actual average speed of the tolled segment and the actual average speed on the non-tolled segment is used. If the delta is high when then toll needs to be raised, the amount it is raised is proportionally higher. If the delta is high when the toll needs to be reduced, the amount of reduction is inversely proportionally lower—i.e. the drop in toll will be small. Finally, in one example, at the end of the use of the tolled lanes, the average speed of the vehicle is calculated for the duration of the journey on the tolled road segment. If the average speed of the vehicle matches (or exceeds) the "free flow" preset speed, the toll does not change. If the average speed of the toll road falls below this threshold, a discount is given. Therefore the invention not only allows for efficient use of tolled lanes, but also ensures that drivers of vehicles also get premium services as appropriate.

With specific reference to the drawings, FIG. 1 illustrates a routing system in which the present invention may be implemented. As shown, there are two road segments 101 and 103 by which a driver of a vehicle can go from a first location 100 designated Location A and a second location 102 designated Location B. The first road segment 101 is a toll road where a driver enters the toll road at a toll entrance 105 and exits the toll road at a toll exit 107. The second road segment 103 is a non-toll road with cross-roads 131 and intersections 125 which may include traffic signals 127 and 129 and other traffic control devices. In FIG. 1, vehicles A, B, C and D are illustrated on the toll road 101 moving from Location A toward Location B and will pass through the toll exit 107 to leave the toll road upon arriving at Location B. Vehicles E, F, G, H, I, J, K and L are vehicles on the non-toll road 103 moving from Location A to Location B and upon arriving at Location B will not be required to pay a toll. As shown in the illustrated example, spaced in parallel along the way at corresponding distances between Location A and Location B are a series of four vehicle detector devices for each road segment, i.e. D1 109, D2 111, D3 113 and D4 115 on the toll road 101, and D5 117, D6 119 D7 121 and D8 123 on the non-toll road 103. The vehicle detector devices may be implemented, for example, with electronic overhead signs, which may be installed alone or at overhead bridges or bypasses, and which include one or more vehicle detecting devices arranged to detect specifically identified vehicles as they pass beneath the detectors 109-123. The detectors D1-D8 would also include a display device (not shown) for displaying information, including current toll charges, to the drivers of the vehicles passing beneath the detector devices D1-D8. Each vehicle on both the toll road 101 and the non-toll road 103 would be identifiable by the vehicle detectors through the use of a smart tag system or any of the other methodologies noted above for the identification of each particular vehicle. In addition, as each vehicle passes beneath a vehicle detector, certain data are made known and logged into or saved by the detector tracking system. For example, when a vehicle passes beneath a vehicle detector, the identity of the vehicle is known as well as its position on the road segment and the time that has elapsed since that vehicle has passing by the previous vehicle detector. It is noted that the vehicle detector devices may take on many forms and may, for example, instead of being overhead detectors, be sign-post detectors at the side of the road segments in a similar parallel toll/non-toll positional arrangement as that shown for the overhead example. Further, the toll road system may also be implemented in various arrangements. In another example, the toll segment may be a high-speed lane or lanes of a multi-lane highway.

Figure 2:
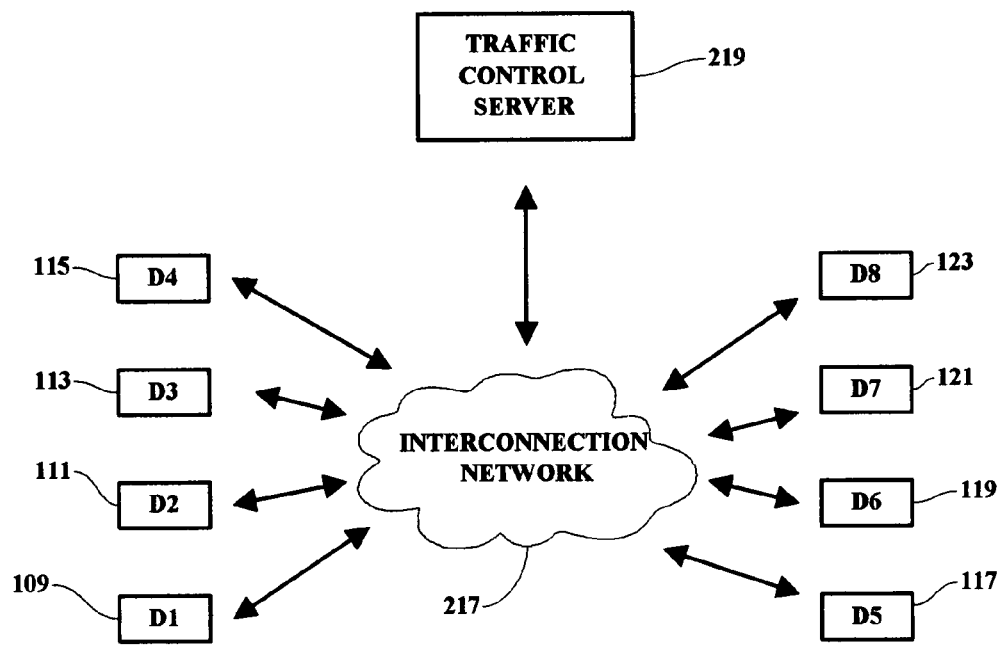
FIG. 2 is a system diagram illustrating a typical interconnection scheme which may be used with the present invention.

As shown in FIG. 2, each detector D1-D8, 109, 111, 113, 115 and 117, 119, 121 and 123 are arranged for connection to a traffic control server 219 through an interconnection network 217. The interconnection network 217 and the connections to the detectors D1-D8 and also to the traffic control server 219 may be hard-wired or wireless or any combination of wired and wireless connections.

Figure 3:
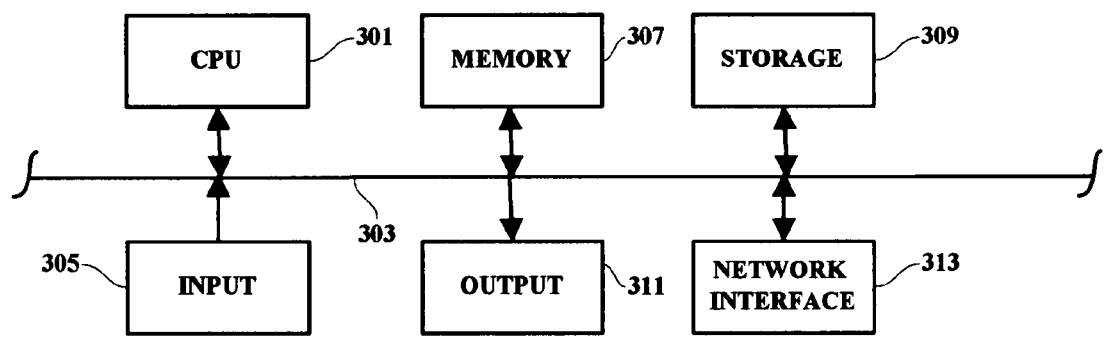
FIG. 3 is a schematic diagram of several of the components of a traffic control server device which may be used with the present invention.

FIG. 3 illustrates several of the major components of the server 219. As shown, the server 219 includes a CPU 301 coupled to a main bus 303. Also coupled to the main bus is a memory unit 307 along with a storage unit 309, input means 305, output means 311 and a network interface 313 for coupling to an interconnection network, for example 217. Other devices and systems may also be coupled to the main bus as appropriate and/or necessary for particular applications.

Figures 4, 5:
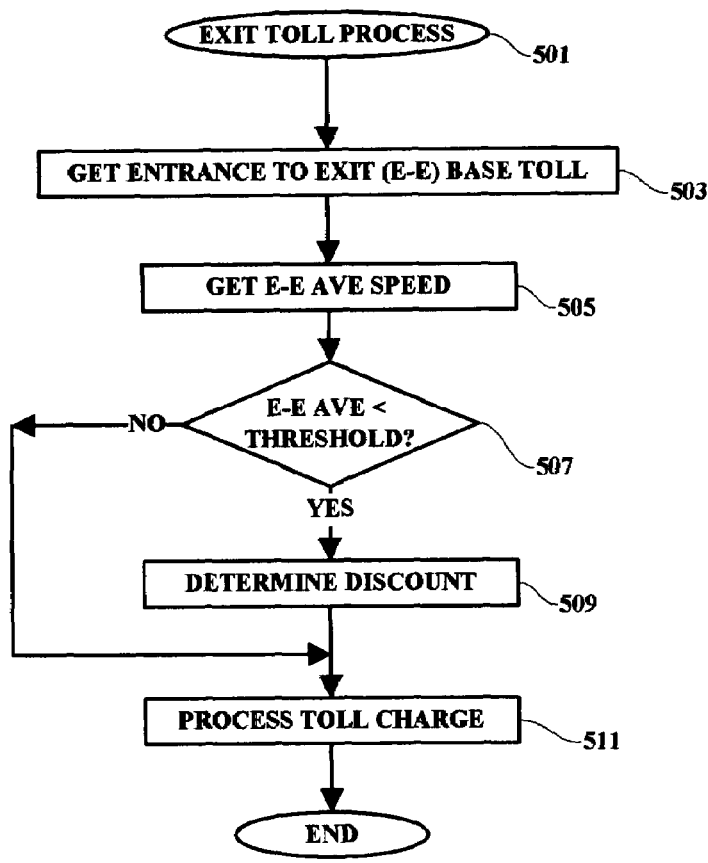
FIG. 4 is an example of a portion of a data base which may be implemented in accordance with the present invention.
FIG. 5 is a flow chart illustrating an exemplary functional sequence in one implementation of the present invention.

In FIG. 4, there is shown an exemplary database 401 which may be maintained by the server 219 in association with the dynamic toll system of the present invention. As shown, there is an record for each vehicle, e.g. A-D, which includes a point of entry 403 for the vehicle, the average speed 405 and 407 of each vehicle at each detector location relative to the previous detector location D(m) . . . D(m+1), and also relative to the starting point, as well as the road exit point 409 of each vehicle and the entry-to-exit (E-E) average speed 411 for each vehicle. Average speeds can be calculated and maintained for each vehicle using the known distance between the vehicle detectors and the time it takes for each vehicle to travel between successive detectors as well as between entry and exit points.

FIG. 5 illustrates an exemplary processing methodology which may be used in one implementation of the present invention. As shown, when a vehicle is exiting the toll road segment, the exit toll process 501 retrieves an entrance-to-exit base toll 503 and then determines the average E-E average speed 505 for the particular vehicle exiting the toll road. If the overall or E-E average speed is less than a predetermined threshold number 507, which means a driver has driven at a slower rate than a desired free flow rate, then a discount is determined 509 and the toll charge is processed using the discount. If the E-E average speed for the particular exiting vehicle is not less than the threshold or free flow rate of speed 507, then the toll is processed using the base toll without discount. The toll processing may be an actual collection of the toll at the exit or an electronic accounting entry by the server 219 into a driver's account which is periodically billed to the driver or debited from a driver's account.

As a means to control the number of vehicles, and therefore presumably the average speed for all of the vehicles on the toll road 101, the toll charge may be dynamically varied depending upon the amount of traffic and the average speed of the vehicles on the toll road 101. In one example of an implementation of this scheme, an electronic sign may be arranged at an entry point 105 to the toll road 101 and also included in each of the detector devices D1-D8. The sign will display the current toll between points on the toll road 101. As the measured average speed of the vehicles on the toll road decreases, the toll charged for travel between any two points on the toll road is increased so that fewer vehicles will be entering the toll road. As the overall average speed again increase approaching a predetermined free-flow average speed, then a decrease in the toll charge is determined and may be displayed at the entrance to the toll-way 105. The manner in which the toll is dynamically increased or decreased depends upon detected average speeds for both the toll segment 101 and the non-toll segment 103 as is explained in greater detail in connection with FIGS. 6-8.

Figure 6:
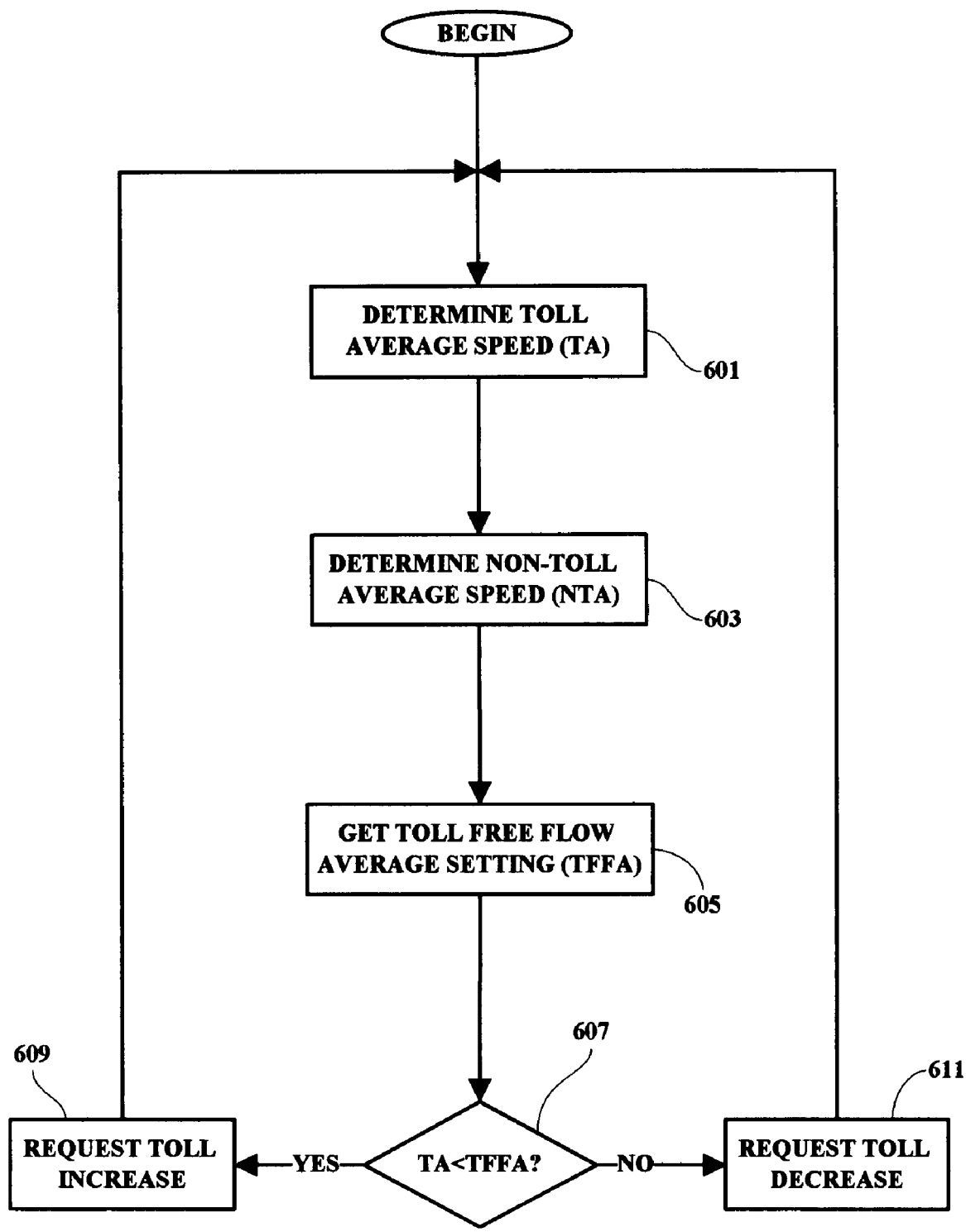
FIG. 6 is a flow chart illustrating an exemplary methodology in determining when a toll adjustment is requested.

As shown in FIG. 6, the amount of toll charged for travel between any two detector locations on the toll road 101 is determined by continuously determining an average speed 601 for all vehicles between the two detector locations in question. The average speed for vehicles traveling on a corresponding segment (i.e. between corresponding detector locations) of the non-toll road 103 is also determined 603. Next, the predetermined free-flow average setting or speed is retrieved 605. If the actual average for vehicles on the toll road segment in question is less than the predetermined free-flow setting, the a toll increase is requested 609 and posted on the system display devices visible to the drivers on the toll system in order to alert drivers that the average speed is slower than desirable and to deter some drivers from using the toll road. If the actual average for vehicles on the toll road segment in question is not less than the predetermined free-flow setting, the a toll decrease is requested 611 and posted on the system display devices visible to the drivers on the toll system in order to alert drivers that traffic is running either at or exceeding the predetermined free-flow average speed and the tolls are decreased.

Figure 7:
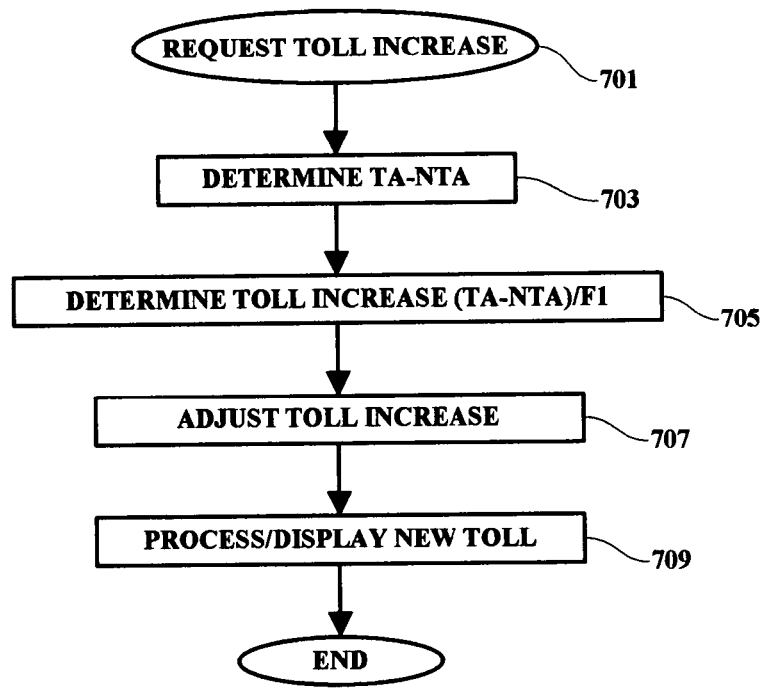
FIG. 7 is a flow chart illustrating an exemplary methodology in determining an amount of toll increase.

As shown in FIG. 7, when a request for toll increase is processed 701, the difference between the average speed on the toll segment TA 101 and the average speed on the non-toll segment NTA 103 is determined 703. The amount of the toll increase is then determined using, for example, the difference between TA and NTA, with that difference divided by a factor F1, wherein F1 is a predetermined amount, for example ten dollars ($10). Next the toll amount for the particular segment being determined is adjusted and rounded-off 707 and the calculated dynamic new toll charge for the particular road segment is processed, stored and displayed 709 on the system display devices.

Figure 8:
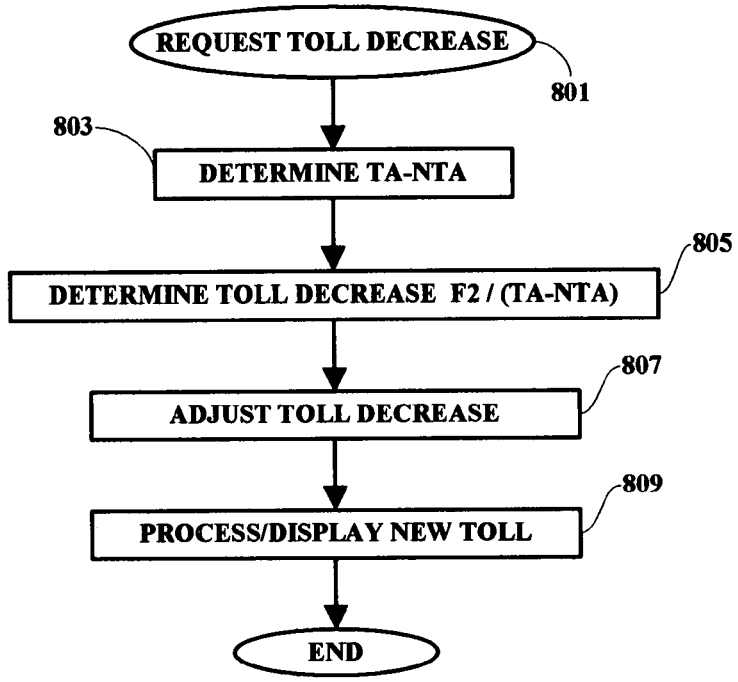
FIG. 8 is a flow chart illustrating an exemplary methodology in determining an amount of toll decrease.

As shown in FIG. 8, when a request for toll decrease 801 is processed, the difference between the average speed on the toll segment TA 101 and the average speed on the non-toll segment NTA 103 is determined 803. The amount of the toll decrease is then determined using, for example, a second factor F2 divided by the difference between TA and NTA, wherein F2 is a predetermined amount, for example the number "25". Next the toll amount for the particular segment being determined is adjusted and rounded-off 807 and the calculated dynamic new toll charge for the particular road segment is processed, stored and displayed 809 on the system display devices.

As each vehicle exits the tolled road segment the actual average speed is calculated. If this speed fell under the threshold, a discount is then given. This discount can be a predetermined advertised discount, for example, 50%.

In a specific example, the dynamic toll determining system would initially determine that the average speed of the non-toll lanes is 30 miles per hour (mph). The current average speed of the tolled lanes is 40 mph. The free flow average speed threshold has been set to 50 mph. The current charge to use the toll road from the entrance 105 to the exit 107 is $4.00. The system raises an alert that the toll road charge needs to be increased because the average vehicle speed using the toll road has fallen under the threshold of 50 mph. The delta or difference between the average speed of the toll road and non-toll road is calculated to be (50 mph.−30 mph)=20 mph. The system calculates that the toll increase is calculated to be (difference in speed/10) dollars. In this case 20/10=$2 increase. The toll is now set to $6 to deter drivers from using the toll road.

Because the toll is now relatively high, fewer vehicles are using the toll road 101 and more vehicles are using the non-toll road 103. The tolled lanes start to speed up. The average speed of vehicles using the toll road 101 starts to increase. The average speed of the vehicles on the non-toll lanes start to decrease to 25 mph. The average speed of the tolled lanes now reaches the threshold average speed of 50 mph. An alert to reduce the toll is generated. The delta of the two average speeds is now 50−25=25 mph. The system calculates that the toll decrease is (25/difference in speed) dollars as adjusted to the nearest dollar. In this case 25/25=$1. The toll is therefore reduced by $1 to $5.

The algorithm therefore quickly increases the toll when the average toll road speed is too low, but maintains a high toll whilst the delta between toll and non-toll traffic is high in order to maintain value of service to toll road users.

The method and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored on a CD, disk or diskette (portable or fixed), memory stick or other memory device, from which it may be loaded into memory and executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A programmed medium, said programmed medium being selectively accessible by a computer system to provide program signals, said program signals being operable for determining a varying toll charge for use of a toll segment of a road, said road including said toll segment and a non-toll segment, said road being designed whereby drivers of vehicles are enabled to use either said toll segment or said non-toll segment to travel between first and second locations, said program signals being further operable for:
    determining an average speed for vehicles traveling on said toll segment of said road;
    determining an average speed for vehicles traveling on said non-toll segment of said road;
    determining a difference between said average speed for vehicles traveling on said toll segment and said average speed for vehicles traveling on said non-toll segment; and
    using said difference in calculating a toll charge for vehicles using said toll segment, said calculating being accomplished by a computer device.

2. The programmed medium as set forth in claim 1 wherein said program signals are further effective for:
    enabling an input to said computer of a desired free-flow average speed for vehicles traveling on said toll segment; and
    increasing said toll charge if said average speed for vehicles traveling on said toll segment is equal to or less than said free-flow average speed.

3. The programmed medium as set forth in claim 2 wherein said toll charge is increased by an amount related to said difference divided by a first factor, said first factor being a constant number which when divided into said difference provides a predetermined toll increase, said predetermined toll increase being designed to deter drivers from using said toll segment.

4. The programmed medium as set forth in claim 1 and further including:
    enabling an input to said computer of a desired free-flow average speed for vehicles traveling on said toll segment; and
    decreasing said toll charge if said average speed for vehicles traveling on said toll segment is equal to or greater than said free-flow average speed.

5. The programmed medium as set forth in claim 4 wherein said toll charge is decreased by an amount related to a second factor divided by said difference, said second factor being a constant number which when divided by said difference provides a predetermined toll decrease, said predetermined toll decrease being designed to encourage drivers to use said toll segment.

6. The programmed medium as set forth in claim 1 and further including:
    enabling an input to said computer of a desired free-flow average speed for vehicles traveling on said toll segment;
    increasing said toll charge if said average speed for vehicles traveling on said toll segment is less than said free-flow average speed; and
    decreasing said toll charge if said average speed for vehicles traveling on said toll segment is greater than said free-flow average speed.

7. A system for determining a varying toll charge for use of a toll segment of a road, said road including said toll segment and a non-toll segment, said road being designed whereby drivers of vehicles are enabled to use either said toll segment or said non-toll segment to travel between first and second locations, said system including:
    means for determining an average speed for vehicles traveling on said toll segment of said road;
    means for determining an average speed for vehicles traveling on said non-toll segment of said road;
    means for determining a difference between said average speed for vehicles traveling on said toll segment and said average speed for vehicles traveling on said non-toll segment; and
    means for using said difference in calculating a toll charge for vehicles using said toll segment, said calculating being accomplished by a computer device.

8. The system as set forth in claim 7 and further including:
    means for inputting to said computer a desired free-flow average speed for vehicles traveling on said toll segment; and
    means for increasing said toll charge if said average speed for vehicles traveling on said toll segment is equal to or less than said free-flow average speed.

9. The system as set forth in claim 8 wherein said toll charge is increased by an amount related to said difference divided by a first factor, said first factor being a constant number which when divided into said difference provides a predetermined toll increase, said predetermined toll increase being designed to deter drivers from using said toll segment.

10. The system as set forth in claim 7 and further including:
    means for inputting to said computer a desired free-flow average speed for vehicles traveling on said toll segment; and
    means for decreasing said toll charge if said average speed for vehicles traveling on said toll segment is equal to or greater than said free-flow average speed.

11. The system as set forth in claim 10 wherein said toll charge is decreased by an amount related to a second factor divided by said difference, said second factor being a constant number which when divided by said difference provides a predetermined toll decrease, said predetermined toll decrease being designed to encourage drivers to use said toll segment.

12. The system as set forth in claim 7 and further including:
    detector devices positioned at corresponding points along said toll segment and said non-toll segment, said detector devices being operable for detecting particular ones of said vehicles and determining an amount of time for each of said vehicles to travel between different ones of said detector devices on both said toll segment and said non-toll segment, said amount of time being used to determine said average speed of each of said vehicles, said system further including display means arranged for displaying said varying toll charge to said drivers.

* * * * *